(12) United States Patent
Colegrove et al.

(10) Patent No.: US 6,415,383 B1
(45) Date of Patent: Jul. 2, 2002

(54) ADDRESS OFFSET FEATURE FOR A HARD DISK DRIVE

(75) Inventors: Dan Colegrove, Morgan Hill, CA (US); Klaus Smolin, Mainz (DE); Alfred Malina, Loerzweiler (DE); Martin Roosen, Hochheim (DE); Kazuyuki Kobayashi, Yokohama; Masaki Kohno, Yamato, both of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/414,301

(22) Filed: Oct. 6, 1999

(51) Int. Cl.[7] ................................................. G06F 9/06
(52) U.S. Cl. ........................... 713/2; 711/101; 711/170; 711/173; 711/202
(58) Field of Search ................................. 711/100, 101, 711/4, 170, 173, 202; 713/2

(56) References Cited

U.S. PATENT DOCUMENTS

| | | | |
|---|---|---|---|
| 5,136,711 A | * 8/1992 | Hugard et al. ................. | 713/2 |
| 5,210,844 A | 5/1993 | Shimura et al. ............ | 711/153 |
| 5,325,532 A | 6/1994 | Crosswy et al. ................ | 713/2 |
| 5,613,082 A | 3/1997 | Brewer et al. ................. | 711/4 |
| 5,715,462 A | 2/1998 | Iwamoto et al. ............ | 345/712 |

* cited by examiner

Primary Examiner—Than Nguyen
(74) Attorney, Agent, or Firm—Lewis L. Nunnelley; Randall J. Bluestone; Noreen A. Krall

(57) ABSTRACT

A method of changing the operating system in a computer system by using an address offset mode (AOM) feature for the address space of a hard disk drive connected to the computer system. Initialization of the computer loads the first operating system (OS) from a user area in the disk drive address space. An enable AOM command offsets the disk drive address space and reinitializes the computer to load a second OS from a reserve space in the disk drive address space. A command setting the maximum size of the address space of the hard disk drive provides a wrap around feature allowing the entire address space of the disk drive to be addressable for diagnostics or updating purposes. The computer is returned to operation with the first OS by a disable AOM command, or alternatively, by a power on reset, a software reset or a hardware reset. The method of changing operating systems is coded in the hard disk drive and does not require additions or modifications to the memory or the BIOS ROM of the computer system.

6 Claims, 4 Drawing Sheets

ADDRESS OFFSET FEATURE FOR A HARD DISK DRIVE

BACKGROUND OF THE INVENTION

1. Field of the Invention

This invention relates in general to incorporation of an alternate second operating system in a computer, and more particularly, to a method of incorporating a second bootable operating system in a disk drive with a temporary address offset feature that allows the entire disk address space to be accessible in the alternate address mode.

2. Description of Related Art

Personal computer systems perform initial code loading (booting) by reading the operating system from a predefined address on a disk file to a random access memory (RAM) in the central processing unit (CPU) of the computer system. In many personal computer systems it is advantageous or desirable to have two separate operating systems (OS) which may be separately activated. The different operating systems may be needed to overcome incompatibilities involving, for example, input/output (I/O) device addresses, I/O busses, peripheral devices, the Basic Input/Output System (BIOS), and the operating systems themselves. In other personal computer systems, it may be advantageous to have a second OS to update system files that cannot be accessed by the first OS or to run diagnostic programs which may be hidden from or otherwise unavailable during normal operation of the first OS by the user.

The prior art provides methods for partitioning the hard disk drive attached to the personal computer system to provide a memory area for storage (installation) of a first OS and second memory area for storage of a second OS. Usually each OS assumes that its Initial Program Load (IPL) and partition tables are located at absolute sector zero on the hard disk drive. An offset value to the address location of a second OS may be provided in a modified second BIOS that allows the second OS to be booted as if loaded at the absolute sector zero. One disadvantage of this method is that changes to the computer BIOS and additional BIOS read only memory (ROM) are needed adding to the complexity and cost of the personal computer system.

Another disadvantage of this method is that accessibility of the disk drive address space is limited to the address space allocated to the OS that is operable at a given time. Although the limited addressability provides protection against accidental alterations to the alternate OS files, the ability to use the second OS to provide diagnostic support for the first OS is severely limited.

Therefore, there is a need for a method of changing the OS of a computer system from a first OS to a second OS without the need to redesign the computer BIOS and without limiting addressability to the entire disk drive address space.

SUMMARY OF THE INVENTION

It is an object of the present invention to disclose a method to change operating systems (OS) of a computer system from a first OS system to a second OS system by having an address offset feature on a disk drive to access the second OS system.

It is another object of the present invention to disclose a method to configure the address offset feature so that the offset address space wraps around so that the entire disk drive address space remains addressable in the address offset mode of operation.

It is a further object of the present invention to disclose a method wherein the computer system automatically reverts to the first OS system from the second OS system when the computer system is powered on.

These and other objects and advantages are attained in accordance with the principles of the present invention by an address offset feature in a disk drive to temporarily offset the drive address space to a reserved area on the disk drive in which an alternate OS system exists. Computer systems perform initial code loading (booting) by reading from a predefined address on a disk drive. In the present invention, a first OS system is stored in a user area having a location of the first logical block address (LBA) designated LBA 0. A second OS system, which may be hidden from the user, is stored in a reserved area having a first LBA designated LBA R immediately following the user area in which the first OS system is stored. In an address offset mode (AOM) of operation, an address offset by an amount −R is applied to the disk drive address space such that the start of the reserved area is changed from LBA R to LBA 0. A command to set the maximum address of the disk drive address space to the sum of the user area address length and the reserved area address length effectively wraps the reserved area space around so that the reserved area effectively ends at the beginning of the user area. This wrap around of the offset address space allows the entire disk drive address space to be addressable in the address offset mode (AOM).

On advantage of the present invention is the availability of switching between two operating systems, especially for providing diagnostic services.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF TEE PREFERRED EMBODIMENT

The following description is the best embodiment presently contemplated for carrying out the present invention. This description is made for the purpose of illustrating the general principles of the present invention and is not meant to limit the inventive concepts claimed herein.

The invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMs, etc., thereby making an article of manufacture according to the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer programming code according to the invention.

Figure 1:
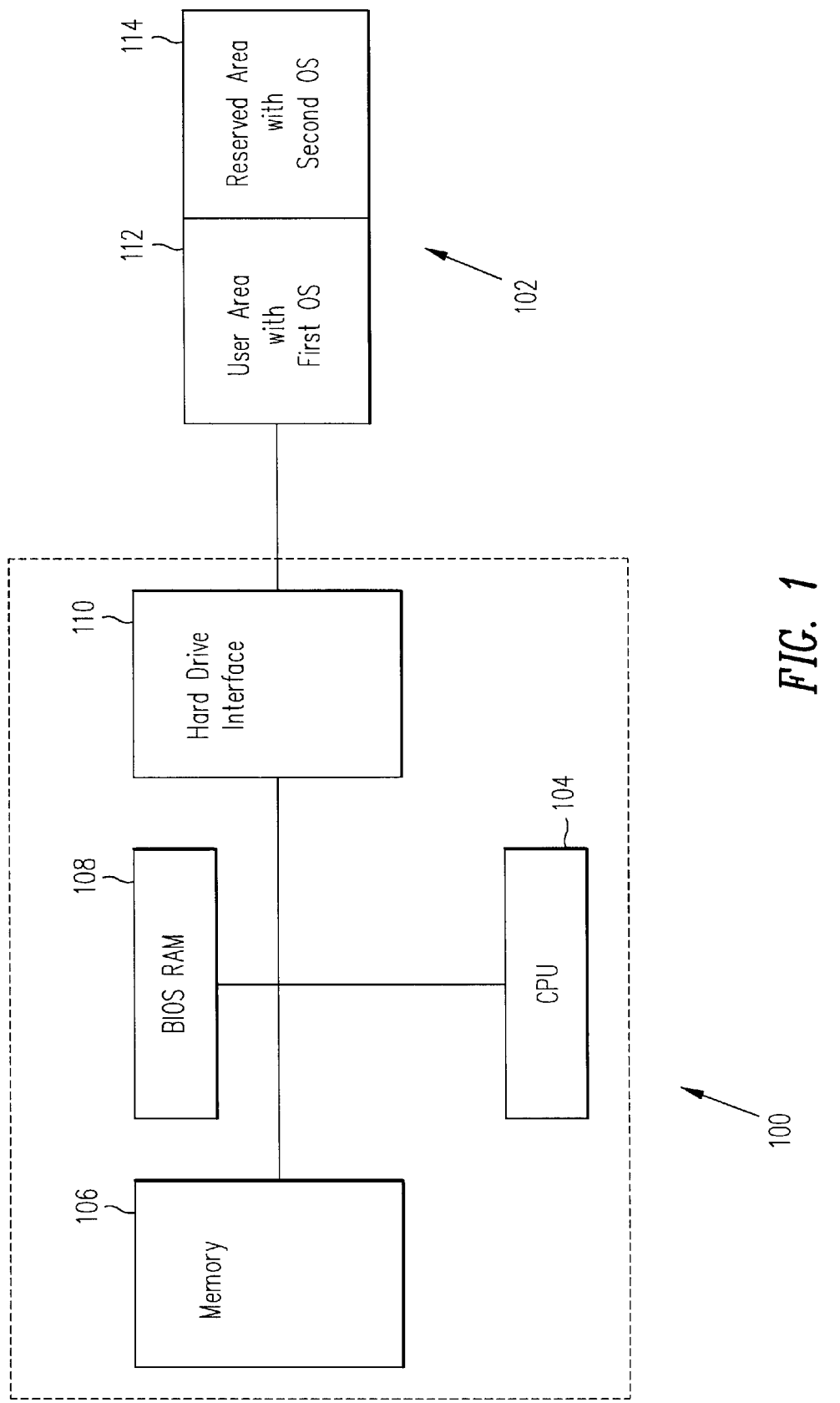
FIG. 1 is a schematic diagram of a personal computer system which incorporates the present invention.

FIG. 1 is a schematic diagram of a personal computer system 100 and a hard disk drive having an address space 102 incorporating an embodiment of the present invention. The computer system 100 includes a central processing unit (CPU) 104, a memory 106, a BIOS read only memory (ROM) 108, and a hard disk drive interface 110. The hard disk drive address space 102 is organized to have a user area (user space) 112 of the disk drive address space having a first operating system (OS) stored in the user space 112 and a reserved area (reserved space) 114 of the disk drive address space having a second OS stored in the reserved space 114. In the preferred embodiment, the first OS stored in the user space 112 is the primary OS used to run the normal operation of the computer system 100. The second OS stored in the reserved space 114 is a secondary OS system used to run a drive fitness test (DFT) diagnostic program for checking the computer system in the event of a failure of the system operating under the first OS.

Figure 2:
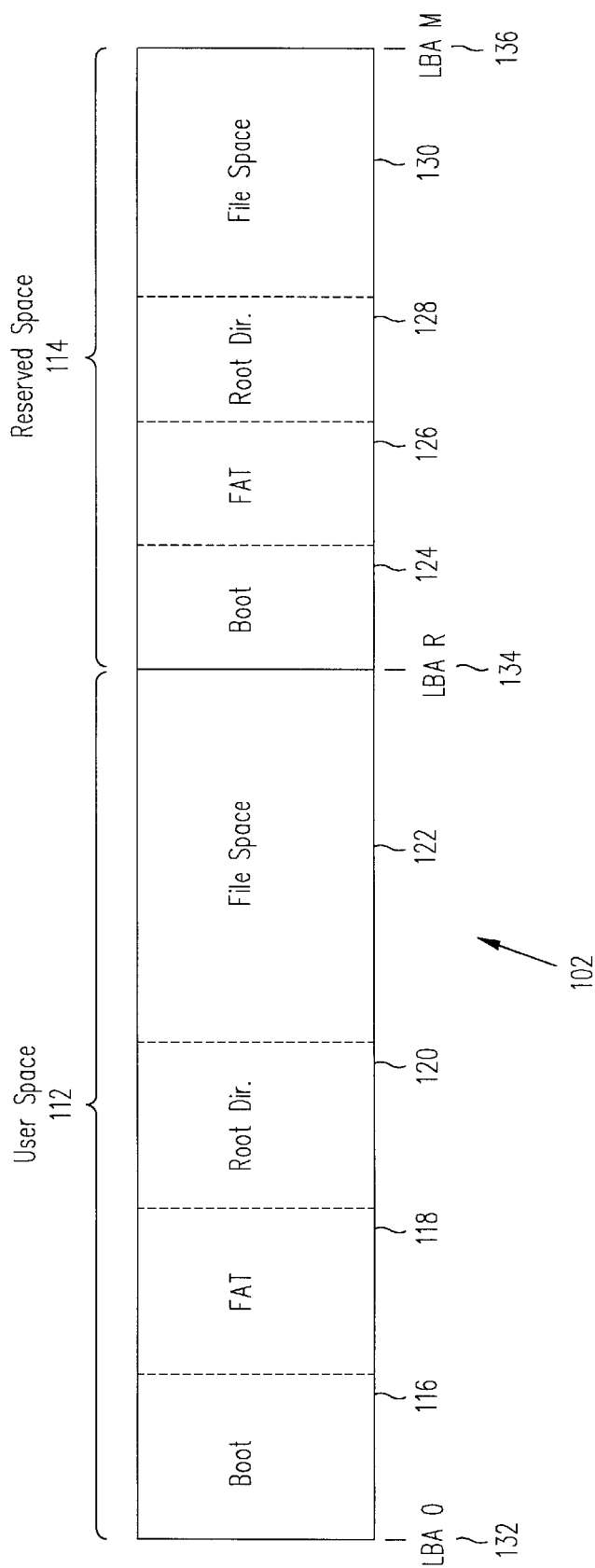
FIG. 2 is a schematic diagram of the address space of a hard disk drive according to an embodiment of the present invention.
Figure 3A:
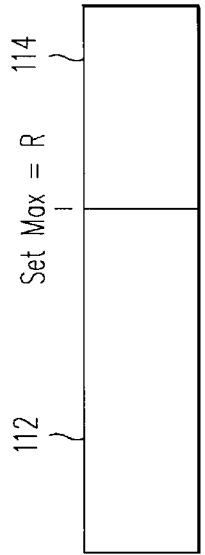
FIG. 3 is a schematic diagram of the address space of a hard disk drive at various stages of the address offset process according to an embodiment of the present invention.
Figure 3B:
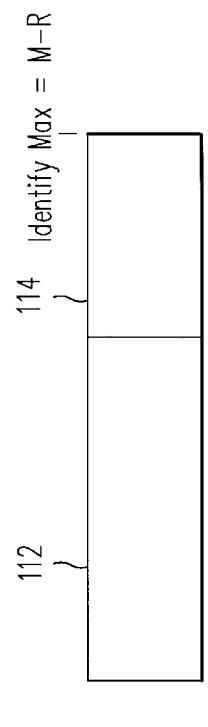
Figure 3C:
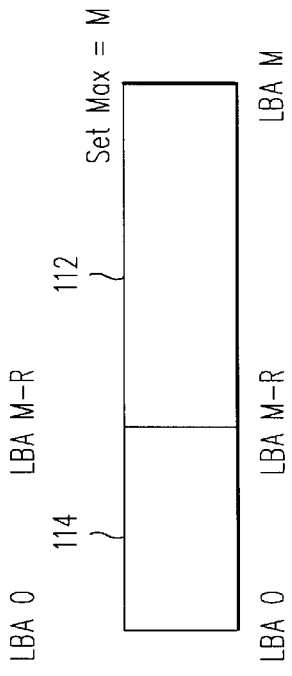
Figure 3D:
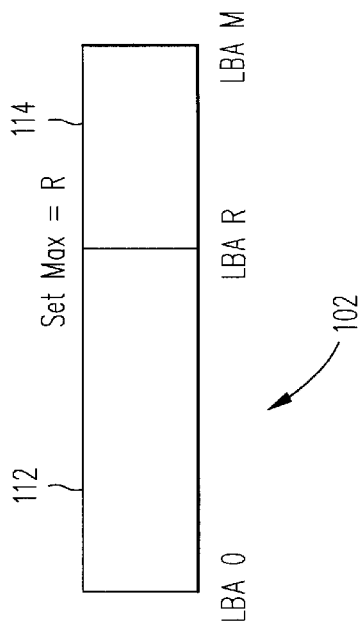

FIG. 2 is a schematic diagram illustrating the organization of the hard disk drive address space 102. The address space 102 is divided (partitioned) into a user space 112 and a reserve space 114. The user space 112 comprises a first boot space 116, a first file allocation table (FAT) space 118, a first root directory space 120, and a first file space 122 which is located at the first physical sector of the hard disk designated by a logical block address zero (LBA 0) 132. The first OS or primary OS of the computer system 100 is stored in the first file space 122.

The reserve space 114 comprises a second boot space 124, a second FAT space 126, a second root directory space 128, and a second file space 130 which is located at LBA R (where R is an address number greater than zero), a physical sector of the hard disk drive immediately following the user space 114. The second OS used to run the DFT program is stored in the second file space 130. The end of the reserve space 114 located at LBA M (where M is an address number greater than R) is also the end of the address space 102.

FIG. 3 is a schematic diagram of the address space of the hard disk drive 102 at various stages of an address offset process according to the preferred embodiment of the present invention. The user space 112 containing the first OS and its associated files is stored at a location beginning at LBA 0 and ending at LBA R. In normal operation of the computer system 100 illustrated as condition A of FIG. 3, when the system is started (booted), the primary or first OS is conventionally located at the first physical sector in the hard disk drive address space beginning at LBA 0. A SET MAX indicator designating the largest accessible address in the address space when using the first OS is set at SET MAX=R. With SET MAX=R, the reserve area 114 containing the second OS and its associated files located between LBA R and LBA M is hidden (inaccessible) to the computer system 100.

If, during operation of the computer system 100 using the first OS, a malfunction or other abnormal condition occurs, the user may wish to run a diagnostic program such as the drive fitness test (DFT) in order to verify the integrity of the first OS and to identify the source of the malfunction or other abnormal conditions. To run the DFT, the user may use a Set Features Enable Address Offset Mode (AOM) command that functions to temporarily offset the drive address space so that the computer system 100 is rebooted using the second OS stored in the reserved space 114. If a nonvolatile reserved space 114 has not been established in the hard disk drive address space 102 before the computer system 100 receives the Set Features Enable AOM command, the command fails with an Abort error status signal. If a reserved space 114 had been established, the Enable AOM command adds an offset of −R to all addresses in the disk drive address space 102, where R is the number representing the location of the start of the reserved space 114. Condition B of FIG. 3 illustrates the status of the address space 102 after the Enable AOM step. The address offset results in the address of the start of the reserved area 114 changing from LBA R to LBA 0 and the address of the end of the reserved area changing from LBA M to LBA M-R. When the computer system 100 is rebooted with the address space 102 in this state, the address space from LBA 0 to LBA M-R containing the second OS is recognized as a user space and is loaded into memory 106. In this state, the previous user area containing the primary or first OS becomes a reserved area and is protected from user access.

In order to run the full DFT program and to correct defects or other problems in the first OS, it may be desirable to have full access to the entire hard disk drive address area 102 while the computer system is operating under the second OS. This full accessibility or "wrap around" feature is obtained by issuing a SET MAX=READ MAX ADDRESS command. Condition C of FIG. 3 illustrates the state of the address space 102 after this command. Since READ MAX ADDRESS returns the largest LBA in the address space 102 read sequentially from LBA 0, a value of READ MAX ADDRESS=M is obtained. Now with SET MAX=M, the wrap around of the user space and the reserve space is in effect and the entire address area 102 is accessible (addressable) while operating under the second OS.

To return the computer system 100 to operation under the primary or first OS, a Disable AOM command removes the offset −R applied to all the addresses in the hard disk drive address space 102 and sets the size of the disk drive address space back to the size specified in the last nonvolatile SET MAX command, that is SET MAX=R. Condition D of FIG. 3 illustrates the effect of the Disable AOM command. Alternatively, in the preferred embodiment of the invention, a Software Reset, a Hardware Reset or a Power On Reset command returns the computer system to the Disable AOM state. This feature ensures that after a shutdown, a restart of the computer system 100 will always reboot with the primary or first OS loaded in the memory 106.

Figure 4:
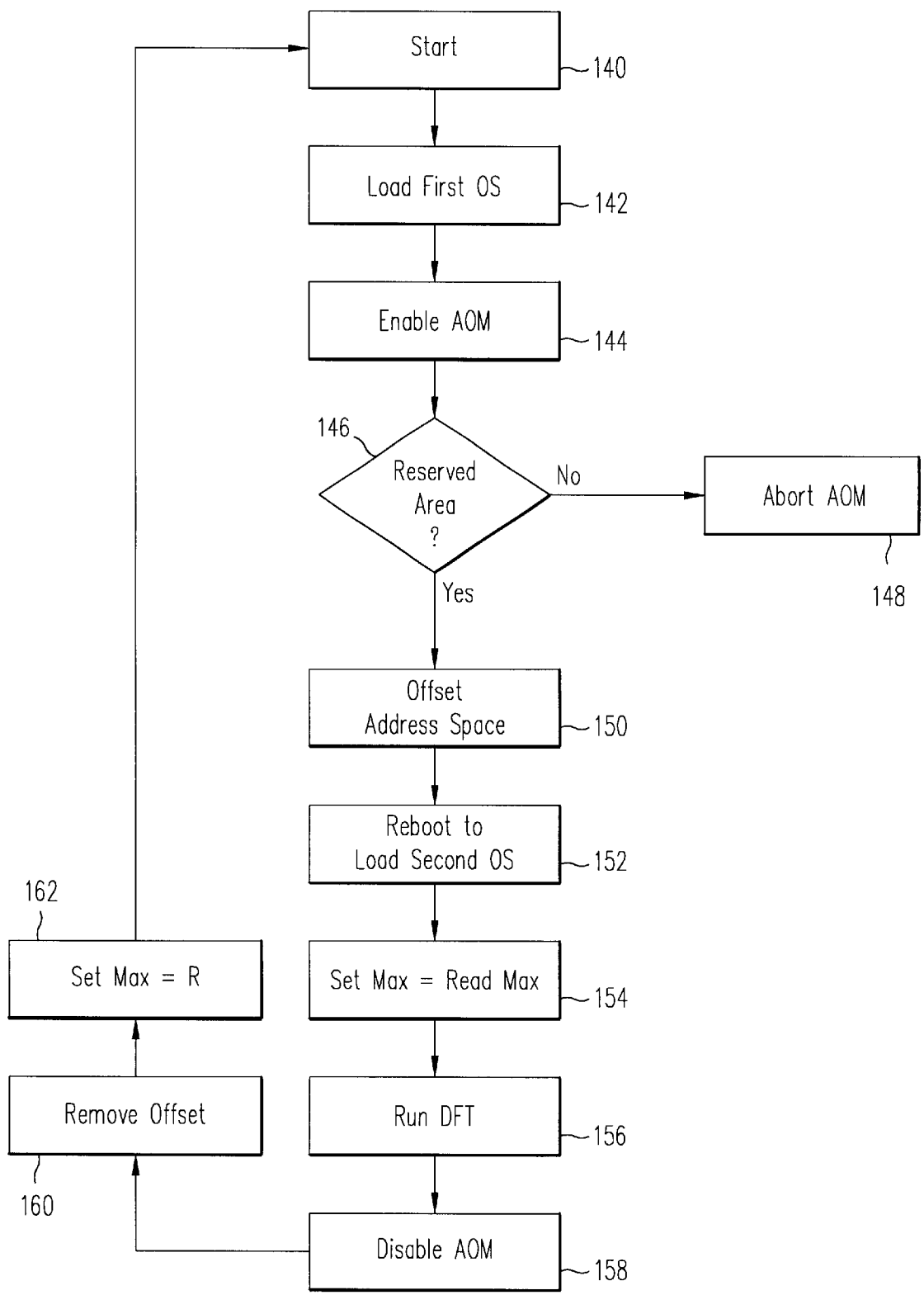
FIG. 4 is a flow diagram of the steps in the method of using an address offset mode process to change the operating systems according to an embodiment of the present invention.

FIG. 4 is a flow diagram illustrating a method of using an address offset mode process to change the operating systems in a computer system 100 according to an embodiment of the present invention. At the start 140 of the process, the personal computer system 100 is powered on and the boot process initiated to load an operating system OS into the memory 106. The boot process addresses the first physical sector of the hard disk address space 102 located at LBA 0 and carries out the load first OS step 142 in which the primary operating system is read into the memory 106 from the user area 112. At this stage, if the first OS fails to operate properly the user may wish to run a diagnostic program to identify and possibly remedy the problem. Having a second OS available to use in running the diagnostic program is an advantage since the primary OS may not be usable due to errors or defects. The user may then initiate the step to enable the address offset mode (AOM) 144. When the enable AOM command is issued, a verify step 146 is run to verify that a reserved space 114 has been established. If no reserved space is found, the abort AOM step 148 fails the enable AOM command and returns an abort error status. If a reserved space 114 has been established, the AOM is enabled resulting in an offset address step 150 in which an address offset is applied to the entire disk drive address space 102. The offset results in the logical block address (LBA) of the beginning of the reserved space becoming LBA 0 as explained previously with reference to FIG. 3. A reboot step 152 causes the computer system 100 to boot again. The boot process addresses LBA 0 and, because of the address offset, loads the second OS from the reserved area 114.

After completion of the reboot step 152, the second OS has been loaded and is running the computer system 100, however, the former user area 112 containing the first OS is protected (unavailable) since the maximum address location recognized by the OS is the last address (LBA M-R) in the former reserved space 114. A SET MAX=READ MAX step 154 removes this protection by causing the maximum address location recognized to become LBA M, the maximum value of the LBAs in the entire address area 102. After step 154 is completed, the wrap around of the two areas 112 and 114 comprising the address space 102 is accomplished and the entire address space 102 is accessible. The wrap around feature allows the second OS to access the first OS to check for and correct errors by means of a run DFT step 156 which invokes the DFT program.

The computer system 100 may at any time be returned to operation under the primary or first OS by a disable AOM step 158 in which a disable AOM command is issued, or alternatively, by a Power on Reset, a Hardware Reset or a Software Reset command. Any of these commands result in a remove offset step 160 in which the address offset mode is disabled causing the addresses of all the locations of the address space 102 to revert to their original values. The remove offset step 160 automatically triggers a SET MAX=R step 162 in which the size of the disk drive address space is set back to the size specified by the last nonvolatile SET MAX address command, that is back to SET MAX=R. Step 162 returns the state of the computer system 100 to the condition at the start step 140 in which the system is booted to load the first OS.

The method for using an address offset mode together with the wrap around feature described above in conjunction with FIG. 4, provides a method of changing the operating system of the computer system 100 while also providing full accessibility of the address area 102 for diagnostic or updating purposes. The method is implemented by code modifications and additions in the disk drive memory and does not require any changes to be made to the computer system memory 106 or BIOS ROM 108.

The embodiments of the present invention described above have used a second OS to carry out diagnostic testing of a first OS in the event of failure or other malfunction of the first OS in operating a computer system. Alternatively, the method of using an address offset mode to change the operating system of a computer system from a first OS to a second OS may be used to allow operation of the computer system with a second operating system that is incompatible with the first operating system. Examples of operating systems in common use that maybe desirable for use with a dual OS compatible computer system include DOS, Win NT, Win95, Win98, UNIX and OS/2. The method of the present invention provides a convenient way to change operating systems in such a dual compatible computer without the need to add additional code to the computer system BIOS ROM. With the method of the present invention, the required code changes and additions are made in the disk drive memory rather than in the more expensive BIOS ROM of the computer system.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

We claim:

1. A method of changing operating systems of a computer system having a disk drive for providing data storage, comprising the steps of:

storing a first operating system in an address space of the disk drive in a user area having a first logical block address (LBA) at the absolute address zero of the disk drive;

establishing a nonvolatile reserved area in the disk drive having a second LBA, the second LBA following sequentially after the user area;

storing a second operating system in the disk drive in the reserved area; and upon initializing the computer system:

(A) loading the first OS from the user area at the absolute address zero of the disk drive;

(B) enabling an address offset mode (AOM) offsetting the address space of the disk drive by the difference of the second LBA and the first LBA;

(C) loading the second OS from the reserved area by reinitializing the computer system;

(D) disabling the address offset mode (AOM) while operating the computer system under the second OS by removing the offset to the address space of the disk drive;

(E) setting a maximum allowed address for the address space to the maximum address in the address space to provide access to the entire address space of the disk drive; and, (F) reloading the first OS from the user area of the disk drive by reinitializing the computer system.

2. The method of changing the operating systems in a computer system as recited in claim 1, wherein the step of disabling the address offset mode is accomplished by using a disable address offset mode command.

3. The method of changing the operating systems in a computer system as recited in claim 1, wherein the step of disabling the address offset mode is accomplished by using a command chosen from a group consisting of a power on reset command, software reset command and a hardware reset command.

4. An article of manufacture comprising a machine readable memory having stored therein a plurality of machine executable control program steps for changing operating systems of a personal computer system having a disk drive for providing data storage, said plurality of stored machine executable control program steps include:

a control program step for storing a first operating system in an address space of the disk drive in a user area having a first logical block address (LBA) at the absolute address zero of the disk drive;

a control program step for establishing a nonvolatile reserved area in the disk drive having a second LBA, the second LBA following sequentially after the user area;

a control program step for storing a second operating system in the disk drive in the reserved area; and upon initializing the computer system:

(A) a control program step for loading the first OS from the user area at the absolute address zero of the disk drive;

(B) a control program step for enabling an address offset mode (AOM) offsetting the address space of the disk drive by the difference of the second LBA and the first LBA;

(C) a control program step for loading the second OS from the reserved by reinitializing the computer system;

(D) a control program step for disabling the address offset mode (AOM) while operating the computer system under the second OS by removing the offset to the address space of the disk drive;

(D) a control program step for setting a maximum allowed address for the address space to the maximum address in the address space to provide access to the entire address space of the disk drive; and, (E) a control program step for reloading the first OS from the user area of the disk file by reinitializing the computer system.

5. An article of manufacture as recited in claim 4, wherein the control program step for disabling the address offset mode is accomplished by using a disable address offset mode command.

6. An article of manufacture as recited in claim 4, wherein the control program step for disabling the address offset mode is accomplished by using a command chosen from a group consisting of a power on reset command, software reset command and a hardware reset command.

* * * * *